(12) United States Patent
Näslund et al.

(10) Patent No.: US 8,977,852 B2
(45) Date of Patent: Mar. 10, 2015

(54) SECURITY FOR SOFTWARE DEFINED RADIO TERMINALS

(75) Inventors: Mats Näslund, Vällingby (SE); Harald Kallin, Sollentuna (SE); Magnus Almgren, Sollentuna (SE); Göran Selander, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 632 days.

(21) Appl. No.: 12/601,569

(22) PCT Filed: Jun. 18, 2007

(86) PCT No.: PCT/SE2007/050428
§ 371 (c)(1),
(2), (4) Date: Jan. 19, 2010

(87) PCT Pub. No.: WO2008/156392
PCT Pub. Date: Dec. 24, 2008

(65) Prior Publication Data
US 2010/0146274 A1    Jun. 10, 2010

(51) Int. Cl.
| | |
|---|---|
| H04W 12/10 | (2009.01) |
| H04L 9/06 | (2006.01) |
| H04L 9/32 | (2006.01) |
| H04L 9/08 | (2006.01) |
| H04W 88/02 | (2009.01) |

(52) U.S. Cl.
CPC .............. *H04W 12/10* (2013.01); *H04L 9/06* (2013.01); *H04L 9/32* (2013.01); *H04L 9/08* (2013.01); *H04W 88/02* (2013.01)
USPC ............................. 713/168; 380/270; 380/44

(58) Field of Classification Search
CPC ......... H04L 9/08; H04W 12/10; H04W 88/02
USPC ......................................................... 713/168
See application file for complete search history.

(56) References Cited

U.S. PATENT DOCUMENTS

| | | | | |
|---|---|---|---|---|
| 6,256,393 | B1 * | 7/2001 | Safadi et al. ................... | 380/232 |
| 6,990,344 | B1 * | 1/2006 | Dolan et al. ................... | 455/437 |
| 7,313,393 | B2 * | 12/2007 | Chitrapu ....................... | 455/425 |
| 7,400,733 | B1 * | 7/2008 | Cam-Winget et al. ........ | 380/283 |
| 7,958,542 | B2 * | 6/2011 | Herrmann ...................... | 726/4 |
| 8,201,216 | B2 * | 6/2012 | Cha et al. ...................... | 726/2 |
| 8,275,988 | B2 * | 9/2012 | Fischer et al. ................ | 713/168 |
| 8,442,233 | B2 * | 5/2013 | Mildh ............................ | 380/272 |

(Continued)

OTHER PUBLICATIONS

Corner et al., "Protecting Applications with Transient Authentication", 2003.*

(Continued)

*Primary Examiner* — O. C. Vostal
(74) *Attorney, Agent, or Firm* — Rothwell, Figg, Ernst & Manbeck, P.C.

(57) ABSTRACT

A module (2) for integrity protection of messages transmitted from a mobile software defined radio (SDR) terminal (1), the module provided with a confined cryptographic key K and arranged to receive loaded SDR-code. The module derives an integrity protecting key Rk from at least said cryptographic key K, and provides a periodic integrity protection on-line of generated messages using said key integrity protecting key Rk, and the integrity of said messages is verified by an integrity checking node (10) of the access network.

43 Claims, 8 Drawing Sheets

(56) References Cited

U.S. PATENT DOCUMENTS

| | | | | |
|---|---|---|---|---|
| 2002/0147926 | A1* | 10/2002 | Pecen et al. | 713/201 |
| 2002/0159444 | A1* | 10/2002 | Vialen et al. | 370/352 |
| 2003/0099358 | A1* | 5/2003 | Michael et al. | 380/270 |
| 2003/0215089 | A1* | 11/2003 | Mihaljevic et al. | 380/42 |
| 2003/0216927 | A1* | 11/2003 | Sridhar et al. | 705/1 |
| 2003/0226021 | A1* | 12/2003 | Chiu | 713/181 |
| 2004/0117623 | A1* | 6/2004 | Kalogridis et al. | 713/165 |
| 2004/0127202 | A1* | 7/2004 | Shih et al. | 455/418 |
| 2004/0172300 | A1* | 9/2004 | Mihai et al. | 705/2 |
| 2004/0228490 | A1* | 11/2004 | Klemba et al. | 380/270 |
| 2005/0055689 | A1* | 3/2005 | Abfalter et al. | 717/174 |
| 2006/0101288 | A1* | 5/2006 | Smeets et al. | 713/194 |
| 2006/0212928 | A1* | 9/2006 | Maino et al. | 726/4 |
| 2006/0253894 | A1* | 11/2006 | Bookman et al. | 726/2 |
| 2006/0282497 | A1* | 12/2006 | Braun et al. | 709/203 |
| 2007/0067634 | A1* | 3/2007 | Siegler | 713/171 |
| 2007/0073887 | A1* | 3/2007 | Prasad et al. | 709/227 |
| 2007/0266035 | A1* | 11/2007 | Hays et al. | 707/10 |
| 2007/0297367 | A1* | 12/2007 | Wang et al. | 370/331 |
| 2008/0022089 | A1* | 1/2008 | Leedom | 713/156 |
| 2008/0072070 | A1* | 3/2008 | LaMacchia et al. | 713/193 |
| 2008/0090575 | A1* | 4/2008 | Barak et al. | 455/444 |
| 2008/0167003 | A1* | 7/2008 | Wang et al. | 455/411 |
| 2008/0182592 | A1* | 7/2008 | Cha et al. | 455/456.3 |
| 2008/0189250 | A1* | 8/2008 | Cha et al. | 707/3 |
| 2009/0067367 | A1* | 3/2009 | Buracchini et al. | 370/328 |
| 2009/0165132 | A1* | 6/2009 | Jain et al. | 726/22 |
| 2009/0299836 | A1* | 12/2009 | Sachs et al. | 705/14.4 |
| 2009/0307487 | A1* | 12/2009 | Movva et al. | 713/156 |
| 2010/0177897 | A1* | 7/2010 | Mildh | 380/270 |

OTHER PUBLICATIONS

Mihaljevic et al., "On a Framework for Employment of Cryptographic Components in Software Defined Radio", 2002.*

Saito et al., "Architectural Defects of the Secure Shell", 2002.*

Becher et al., "Broad-Band Wireless Access and Future Communication Networks", 2001.*

Cummings et al., "Mode Switching and Software Download for Software Defined Radio: The SDR Forum Approach", 1999.*

Godor et al., "Novel Authentication Algorithm—Public Key Based Cryptography in Mobile Phone Systems", 2006.*

O'Droma et al., "Toward a Ubiquitous Consumer Wireless World", 2007.*

Yeun et al., "Applications of Delegation Schemes for Securing Future Reconfigurable Terminals", 2003.*

SDR forum, "Transceiver Facility Specification", SDRF-08-S-0008-v1.0.0, 2008-2009.*

HY-SDR Research Center, "PIM and PSM for Smart Antenna Specification version 1.0", SDRF-07-S-0016-v2.0.0, 2007.*

SDR forum, "Software Defined Radio Commercial Handset Guidelines", SDRF-04-A-006-v0.00, 2004.*

SDR forum, "SDR Forum Comments to FCC in the Matter of Facilitating Opportunities for Flexible, Efficient, and Reliable Spectrum Use Employing Cognitive Radio Technologies and Authorization and Use of Software Defined Radios", SDRF-04-A-0004-v0.00, 2004.*

SDR forum, "Requirements for Radio Software Download for RF Reconfiguration", SDRF-02-S-007-v1.0.0, 2002.*

SDR forum, "Report on Issues and Activity in the Area of Security for Software Defined Radio", SDRF-02-A-0003-v0.00, 2002.*

SDR forum, "SDR Forum Technical Report 2.1 Architecture and Elements of Software Defined Radio Systems as Related to Standards", SDRF Technical Report 2.1 Nov. 1999.*

Beach et al., "The European project TRUST—reconfigurable terminals and supporting networks", 2002.*

Dimitrakopoulos et al., "Scenarios, System Requirements and Roadmaps for Reconfigurability", 2004.*

Campbell et al., "Biometrically Enhanced Software Defined Radios", 2003.*

Falk, R., et al., "Approaches for Secure SDR Software Download", Proceeding of the SDR 04 Technical Conference and Product Exposition, Nov. 15-18, 2004, 6 pages.

Gallery, E., et al., "Protection of Downloadable Software on SDR Devices", Proceeding of the SDR 05 Technical Conference and Product Exposition, Nov. 14-18, 2005, 6 pages.

Gallery, E., et al., Mobile VCE, "Protection of Downloadable Software on SDR Devices", Proceeding of the SDR 05 Technical Conference and Product Exposition, Nov. 2005, 25 pages.

* cited by examiner

SECURITY FOR SOFTWARE DEFINED RADIO TERMINALS

CROSS-REFERENCE TO RELATED APPLICATION

This application is a 35 U.S.C. §371 National Phase Application from PCT/SE2007/050428, filed Jun. 18, 2007, and designating the United States, which published as international publication number WO 2008/156392A1, which publication is incorporated by reference herein.

TECHNICAL FIELD

The present invention relates to an SDR protecting module arranged to integrity protect software-defined radio communication, as well as to a mobile SDR terminal comprising such a module, and to a method of integrity protecting software-defined radio communication.

BACKGROUND

SDR (Software-Defined Radio) refers to radio communication in which e.g. the transmitter modulation and coding, as well as the receiver demodulation and decoding is performed by software-controlled hardware. In a conventional software-defined radio communication terminal, e.g. a mobile phone/terminal, the ADC (Analogue-to-Digital Converter) for converting the analogue audio signal to digital data, the modulator for superimposing the digital data onto a radio-frequency carrier, as well as the demodulator and the DAC (Digital-to-Analogue Converter) may comprise software-controlled hardware circuits, firmware or FPGAs (Field Programmable Gate Arrays).

One advantage with software-defined radio is that different radio protocols may be implemented simply by running different software versions, thereby resulting in an increased flexibility and versatility, and new signal processing algorithms and coding schemes may be introduced in a mobile phone/terminal by a remote updating of the software.

OFDM (Orthogonal Frequency Division Multiplexing) is a digital multi-carrier modulation scheme that may be used in radio communication. In software-defined radio, the modulation may be performed by software, thereby introducing a drawback relating to the security, since a skilled and malicious user may be able to modify or replace the radio signal processing-software in order to access a service without a subscription, or to steal resources from other users. In frequency division schemes, such as e.g. in the above-mentioned OFDM, as well as in TDMA (Time Division Multiple Access) or CDMA (Code Division Multiple Access), a mobile terminal that is experiencing e.g. poor reception quality, a low bit-rate, or bit errors, may be assigned additional resources, e.g. more time-slots, higher transmit power, or a wider frequency range, in order to improve the QoS (Quality of Service). Within a RAN (Radio Access Network), the resource allocation is based on reports from the a mobile terminal, e.g. regarding how well/poor the terminal is able to hear a pilot tone from the RBSs (Radio Base Stations) within range, or regarding the number of lost/erroneous IP packets, and if a mobile terminal reports bad reception, the RAN may try to compensate for this by allocating more resources to this mobile terminal.

A user may modify the existing software in the mobile SDR terminal to e.g. always report bad reception or interference from another terminal, or to favor RBSs belonging to a certain operator or a certain access technology. Another possible modification of the software may encourage a change of cell, technology or service, or pretend lack of capabilities. This manipulation of the software may have the effect that more resources are allocated to a user, that other users are not granted access, that the transmission power is too high and causes interference, or that undesired hand-over decisions are taken.

For example, a user receiving an audio- or video service, allowing bit-errors, may report a too low reception quality in order to be assigned more radio resources, which will result in less radio resources being allocated to the other users. Since a modern RAN performs predictions and optimizations based on reports from the mobile terminals, false information will give the network operator a wrong picture of the overall link status. Therefore, it is important to prevent and/or detect any modification and replacement of the code in a software-defined radio communication terminal, i.e. to provide a so-called integrity protection of the software. Integrity protection of a message transmitted from a sending node to a receiving node is normally implemented by an integrity protection key, Rk, which is known to both the sending node and to the receiving node. Conventionally, a message is integrity protected by the sending node, which computes a message authenticating code, or checksum, based on the message to be sent and on said integrity protection key, Rk, and transmits the message together with said computed checksum. The receiving node will integrity check the received message by, in turn, computing a message authenticating checksum based on the received message and on said integrity protection key, Rk, and compare the computed authenticating checksum with the received authenticating checksum. Only if said computed checksum corresponds to the received checksum, appended to the message, the received message is determined to be authentic and un-modified.

In the present 3G-standard, the RRC—(Radio Resource Control)-signalling is integrity protected by an integrity protecting key, Ik, derived from the USIM-card (Universal Subscriber Identity Module) during a user/subscriber authentication procedure known as AKA (Authentication and Key Agreement). However, this key only provides assurance that a USIM is present, not that the USIM-card is operating with a correct terminal.

Another known method to provide authentication of a terminal is the DRM (Digital Rights Management)-concept, in which the content provider checks that a terminal is provided with a mechanism for copy-protection, e.g. a DRM module, before transferring the content to the terminal. However, this authentication only takes place before the transmission of the data content to the terminal, and no integrity check is performed of a DRM module once provided in the terminal. This means that a skilled user may still be able to modify the terminal and the software after the reception of the content, thereby potentially violating the content usage rules.

A remotely upgraded software may comprise viruses and other mal-ware, and it is known to integrity protect remote (e.g. over-the-air) updates by signing of the software code. However, this only authenticates a code that is distributed from the correct source, and only at the time of the install.

The TCG (Trusted Computing Group) is a consortium that has developed specifications for a so-called TPM (Trusted Platform Module), which may be implemented as a hardware chip for a personal computer and is capable of providing reliable software information to the operating system or an external entity regarding the software of the platform on which it resides. A TPM may perform various security functions, including cryptographic functions and protected hardware-based key and data storage, comprising integrity measurements, storage and reporting of the platform configuration. The integrity measurements collects information representing some data or program code, and the measured entities may relate to hardware or software involved in the execution sequence on the platform, e.g. the BIOS, the boot loader code, the operating system kernel or the application code, such as the SDR (Software-Defined Radio)-code. In a terminal provided with a TPM, it is possible to authenticate a software code each time it is loaded into a memory, thereby offering an improved protection. However, this is normally not performed on-line while the code is running, since this would degrade the performance, and therefore a skilled user may replace the code after the authentication. Even if a request for a "configuration integrity measurement" is made at a later moment, the integrity can only be assured for this particular moment, and not continuously repeated or periodic.

Thus, a TPM is not capable of providing a continuous or periodic on-line verification of software, except without a significantly degraded performance.

SUMMARY

An object of the present invention is to provide a periodic on-line integrity protection of software-defined radio communication, in which the integrity protection is always active and performed on-line, while the code is running, and this object and others are achieved by the arrangement and method according to the appended claims.

According to one aspect, the invention provides an SDR-protecting module for an SDR-terminal, the module provided with a confined cryptographic key K and arranged to receive loaded SDR-code. The SDR-protecting module is further arranged to derive an integrity protecting key Rk from at least said cryptographic key K, and to provide a periodic integrity protection on-line of generated SDR-functionality messages using said integrity protecting key Rk. The integrity of said messages is verified by an integrity checking node in the access network.

The integrity checking node may be arranged to receive the integrity protecting key Rk from a key generating server of the home network by AAA signalling, the key generating server being arranged to derive said integrity protecting key Rk from at least said cryptographic key K.

Alternatively, the integrity checking node may be arranged to derive the integrity protecting key Rk from input values received from the home network, at least one of said input values being dependent on said cryptographic key K, and a copy of the cryptographic key K may be stored in a terminal register unit in the home network.

Said SDR functionality messages may comprise e.g. radio signal measurement reports, and may be associated e.g. with the RRC-layer or with the MAC-layer.

An SDR protecting module may be arranged to receive SDR-code loaded directly from an SDR code storage, and to verify the correctness of the loaded SDR-code, and further to inactivate the control plane signalling generating unit if the loaded SDR-code is incorrect.

Alternatively, an SDR protecting module may be arranged to perform implicit verification of the loaded SDR code by calculating a checksum of the loaded SDR code, and including said checksum in the derivation of the integrity protection key Rk.

Further, the calculation of the checksum of the loaded SDR code, and the derivation of the integrity protecting key Rk, may be repeated periodically, and loaded SDR-code associated e.g. with the RRC layer or with the MAC-layer may be included in said checksum.

The SDR protecting module may be further arranged to include information derived from the security key of the SIM or USIM of the SDR terminal in the calculation of the integrity protection key Rk.

The SDR protecting module may also provide an execution environment for at least a part of the RRC-signalling generation and processing, and it may be implemented at least partly as a hardware module.

According to a second aspect, the invention provides an SDR terminal comprising at least one SDR protecting module, according to the above-described first aspect of the invention.

According to a third aspect, the invention provides a method of integrity protecting SDR-functionality software using an SDR protecting module provided with a confined cryptographic key K, the SDR-protecting module performing the following steps: Receiving loaded SDR code, deriving an integrity protection key Rk from at least said cryptographic key K, and providing a periodic on-line integrity protection of SDR-functionality messages by the derived integrity protection key Rk. The integrity of the messages is verified by an integrity checking node in the access network.

The integrity checking node may further determine the correlation between RRC bad reception-signal reports and TCP ACKNOWLEDGEMENTS relating to an SDR terminal.

The integrity checking node may receive said integrity protecting key Rk from a key generating server in the home network by AAA signalling, and said key generating server may derive the integrity protecting key Rk from a copy of said cryptographic key K stored in a terminal register unit in the home network.

The key generating server may further derive the integrity protecting key Rk from a copy of the loaded SDR code stored in said terminal register unit, and further from a copy of a key from the SIM or USIM stored in a HLR/AuC or a HSS of the home network.

Alternatively, the integrity checking node may derive the integrity protecting key Rk from input values received from the home network, at least one of said input values being dependent on the cryptographic key K, and the home network may further transfer information indicating the SDR-code version to the access network.

The method may also comprise an SDR-module authenticating procedure to verify the presence of the SDR-protecting module, said procedure using information dependent on a copy of the secret cryptographic key K obtained from a terminal register unit of the home network.

The integrity protection may involve a control plane signal generating unit computing a message authenticating checksum using said derived key Rk obtained from the SDR-protecting module, said authenticating checksum being added to the SDR-functionality message before transmission. Correspondingly, the integrity checking node may verify a received SDR-functionality message by comparing the message authenticating checksum added to the received message with a message authenticating checksum calculated from the integrity protecting key Rk, and inactivate the transmission, e.g. by the access network disconnecting the mobile terminal, if said compared message authenticating checksums do not correspond, i.e. are unequal. Further, the SDR protecting module may inactivate the control plane signalling unit if the loaded SDR code is incorrect.

BRIEF DESCRIPTION OF THE DRAWINGS

The present invention will now be described in more detail, and with reference to the accompanying drawings, in which.

DETAILED DESCRIPTION

Figure 1:
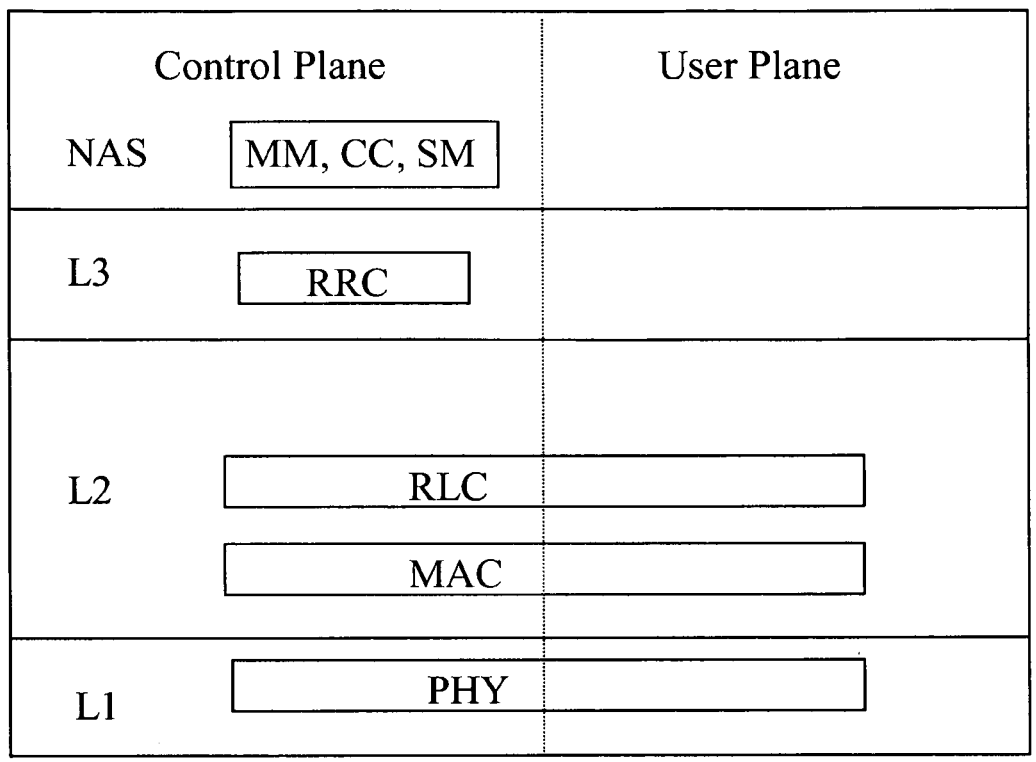
FIG. 1 is a block diagram schematically illustrating a conventional layered protocol stack of a WCDMA/UMTS terminal.

In the following description, specific details are set forth, such as a particular architecture and sequences of steps in order to provide a thorough understanding of the present invention. However, it is apparent to a person skilled in the art that the present invention may be practised in other embodiments that may depart from these specific details.

Moreover, it is apparent that the described functions may be implemented using software functioning in conjunction with a programmed microprocessor or a general purpose computer, and/or using an application-specific integrated circuit. Where the invention is described in the form of a method, the invention may also be embodied in a computer program product, as well as in a system comprising a computer processor and a memory, wherein the memory contains one or more programs that may perform the described functions.

This invention provides a tamper resistant integrity protecting module for a mobile SDR (Software Defined Radio) terminal, and the SDR protecting module is capable of receiving and verifying the correctness of SDR code loaded into the SDR terminal, of managing one or more symmetric or asymmetric terminal-specific cryptographic keys, K, for verifying that the module is in place and for integrity protecting software implementing the SDR-functionalities associated with one or more of the non-physical control plane-layers, e.g. with the RRC (Radio Resource Control) or with the MAC (Medium Access Control)-Layer. The SDR-protecting module is implemented at least partly as a hardware module, and it derives an integrity protecting key, Rk, from a cryptographic key K confined to the module, e.g. configured during manufacturing, the term "confined" used herein indicating that the key K is not obtainable outside the module. However, a key that is derived from the confined cryptographic key K, such as e.g. the above-mentioned integrity protecting key, Rk, is obtainable at an interface to the module. Further, during the configuring of the cryptographic key K, a copy of K is preferably provided to a trustworthy network node.

Preferably, the integrity protecting key, Rk, is made available to a conventional integrity checking node in the access network, e.g. an RNC (Radio Network Controller), by AAA (Authentication, Authorization, Accounting)-signalling from a key generating server in the home network capable of deriving said integrity protecting key Rk from the cryptographic key K. Alternatively, the integrity protecting key Rk is derived by the integrity checking node, which receives input values for the derivation from the home network.

The derived integrity protecting key Rk is used to verify that the module is in place and to integrity protect signalling messages by a signalling message generating unit computing a message authenticating checksum, MAC, based on the integrity protecting key Rk and on said message, and adding said checksum to the message. The integrity of the message is verified by said integrity checking node computing a message authenticating checksum, MAC, based on the received message and on said integrity protection key, Rk, and interrupting or discarding the transmission from the SDR terminal if said computed checksum does not correspond to the received checksum.

FIG. 1 illustrates schematically the Control Plane and the User Plane of a conventional WCDMA/UMTS protocol stack, the Control Plane comprising a NAS (Non Access Stratum)-layer supporting the signaling and traffic between the core network and a mobile terminal, i.e. a UE (User Equipment), an RRC (Radio Resource Control)-layer handling the control plane signalling between the UEs and the radio access network, comprising e.g. cell selection, radio connection set-up and radio bearer management, an RLC (Radio Link Control)-layer handling e.g. the flow- and error control, and an MAC (Medium Access Control)-layer handling e.g. data transfer service to higher layers and functionality for bit-rate control, priority handling of data flow and scheduling of different UEs. Thus, this invention relates to integrity protection of software implementing SDR-functionality associated with one or more of these non-physical control plane-layers, i.e. the control plane-layers above the physical layer, as illustrated in this figure, such as e.g. the RRC- or the MAC-layer, or both of these layers.

Conventionally, each of the layers receives data packets from the higher layer and formats the data packets before forwarding it to the lower layer. A data packet typically comprises a header, a payload and a tail, of which the content of the header includes the logical address associated with the entity performing the processing on the layer, e.g. a MAC address, and the length and the type of the payload. The tail information typically includes a CRC-checksum, and may also include an integrity protecting checksum, and other security data. However, in some systems, e.g. in a WCDMA-system, the integrity checksum is placed in the header. Before forwarding a data packet to a lower layer, a layer may add additional header or tail information, and encrypt the information. Since the RRC-layer, according to the WCDMA standard, implements integrity protection, the header of a WCDMA RRC-layer conventionally comprises a field carrying an integrity protecting checksum. However, if this invention implements integrity protection on a layer which normally does not provide security, e.g. the WCDMA MAC-layer, a data field has to be added, e.g. in the tail, for the integrity protection checksum, thereby requiring extra bandwidth.

Figure 2:
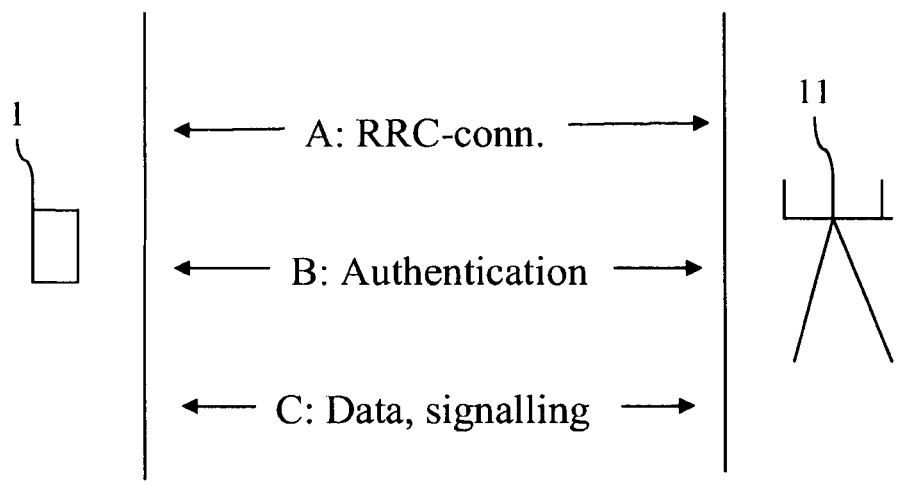
FIG. 2 is a signalling diagram illustrating a conventional radio connection set-up.

FIG. 2 illustrates schematically an exemplary conventional radio connection set-up between a mobile terminal 1 and the RAN (Radio Access Network) 11. In the first step A, the radio connection is established between the terminal and the RAN, and in the second step B, the access request is authenticated using a security key Ki from the SIM (in GSM) or from the USIM (in UMTS), followed by the third step C, comprising further exchange of signalling and data. The SIM/USIM is associated with a subscription to communication services offered by a network operator in the home network of the subscriber.

A conventional SIM authentication procedure, as illustrated in step B of FIG. 2, comprises communication between the mobile terminal provided with the SIM, a VLR (Visiting Location Register) of a visited network, and a HLR/AuC (Home Location Register/Authentication Centre). Conventionally, a VLR stores information relating to current mobile terminals of a MSC (Mobile Switching Centre), and the HLR stores information regarding each authorized mobile subscriber, i.e. details of every (U)SIM issued by the operator, such as the IMSI (the International Mobile Subscriber Identity.) The SIM contains an authentication key Ki, as well as a said IMSI. During the authentication, the mobile terminal sends IMSI to the VLR, which via the HLR/AuC retrieves the same authentication key, Ki, generates a random number RAND, as well as the resulting XRES=f(Ki, RAND). VLR forwards RAND to the mobile terminal and keeps XRES, and the SIM of the mobile terminal calculates RES=f(Ki, RAND), and forwards RES to the VLR. If the RES calculated by the SIM is equal to XRES generated by the HLR, then the VLR will send an encrypted TMSI (Temporary Mobile Subscriber Identity) to the mobile terminal, which will reply with an ACK to the VLR, thereby completing the authentication procedure.

A core of the present invention is the use of at least one SDR protecting module in a mobile SDR terminal, the module acting as an agent in the SDR terminal. A first role of the SDR protecting module is to enforce that only trusted, authentic SDR code can be executed in the mobile SDR terminal, using conventional techniques, such as code integrity and signature verification. The SDR protecting module is capable of determining whether a loaded SDR code is authentic or not, and to block the execution of non-authentic SDR code. However, the SDR protecting module, according to this invention, also serves to securely conveying direct on-line information to the network, thereby enabling an authentication of the SDR software to be performed by the network. Thus, the SDR protecting module is capable of providing information to the network, from which the network may determine whether the executed SDR software is authentic or not. An SDR protecting module, according to this invention, differs from the above-described TPM of the TCG in that the network does not have to explicitly ask the module to supply this information. Thereby, a robust, tamper resistant and remotely detectable SDR protecting module, according to this invention, is capable of an efficient on-line assertion that only trusted and authentic SDR code is executed in a mobile terminal.

Various exemplary embodiments of the present invention will now be described. However, the invention includes combinations and hybrids thereof, as well as numerous other embodiments.

The SDR-protecting module is arranged to derive an integrity protecting key, Rk, from the confined cryptographic key, K, and the network side preferably derives and transfers the integrity protecting key, Rk, to an integrity checking node in the access network by AAA signalling. Alternatively, the integrity checking node derives the integrity protecting key Rk from input values received from the home network. The SDR-protecting module is further arranged to enable the network to verify that the SDR-protecting module is in place in the SDR terminal by acting similarly as a SIM in an SDR-module authenticating procedure, corresponding to the above-described SIM authentication procedure. This SDR-module authenticating procedure assures the presence of the SDR-protecting module by a challenge-response authentication protocol that is analogous to the (U)SIM AKA protocol, but is based on the cryptographic key K, with RES=f(K, RAND). According to a preferred embodiment, the SDR-module authentication protocol is interleaved in the conventional SIM authenticating protocol, e.g. RES=f(K, Ki, RAND), and this interleaving may be referred to as piggy-backing.

The SDR-module authentication is enabled by a terminal register (TR) unit, typically located in the home network, storing a copy of the terminal-specific secret cryptographic key K and cooperating with the HLR/AuC, or possibly with the HSS (Home Subscriber Server in the IMS) in order to authenticate the SDR-protecting module.

According to an exemplary embodiment of the invention, this terminal register unit is co-located with the HLR. However, a mobile terminal does not belong to any operator, and since only the IMSI is sent to the HLR, the mobile terminal may not be uniquely identified. According to alternative exemplary embodiments, the terminal register unit is managed by a terminal vendor, or co-located with an EIR (Equipment Identity Register), i.e. a database employed by mobile networks to detect stolen mobile terminals by checking the IMEI (International Mobile Equipment Identity).

The cryptographic key K confined to an SDR-protecting module, according to this invention, is preferably initially configured in the module during the manufacturing. K is preferably a symmetric key, but in some embodiments an asymmetric key may be advantageous. In symmetric cryptography the same key is used to encrypt and decrypt the data, and in asymmetric key cryptography, different keys are used for encryption and decryption. Similarly, for integrity protection purposes, symmetric cryptography uses the same key for protection/verification, whereas asymmetric cryptography uses different keys. For example, if the cryptographic key K is configured into the SDR-protecting module by the terminal manufacturer, it may be advantageous to use an asymmetric key, so that the manufacturer only has to sign and publish certificates of devices and the public keys. Various performance optimizations are possible, such as the use of dedicated crypto hardware for performing the asymmetric operations, or of certification for temporary short public keys. If the terminal register unit is co-located with the EIR, either symmetric or asymmetric keys may be used, and any trusted third party may be responsible for key management, such that the cryptographic keys may be written into a permanent memory in the SDR protecting module.

However, in order to provide a periodic on-line verification that the SDR-protecting module is in place in the SDR terminal, that the SDR terminal resists any code injection, and that the SDR-protecting module is not clamped with wires connected to an external PC implementing the radio protocols in order to manipulate e.g. the radio resource signalling, a high security is obtained according to a first exemplary embodiment of this invention, in which SDR functionality messages are integrity protected using the integrity protecting key, Rk, derived by the module. The integrity protection of an SDR functionality message, e.g. a radio signal measurement report, is performed by a control plane-signalling generating unit, loaded with the SDR code and associated with e.g. the RRC-layer or with the MAC-layer, obtaining the integrity protecting key Rk from the SDR protecting module and calculating a message authenticating checksum from said integrity protecting key Rk and adding said checksum to the message before transmission. The message is received by the conventional integrity checking node in the radio access network, e.g. an RNC, that checks the integrity by calculating a checksum from said message and from said integrity protecting key Rk, which may be received during AAA (Authentication, Authorization, Accounting)—signalling from a key generating server in the home network, and compares the received checksum with the calculated checksum. If the checksums do not correspond, it is determined that the message has been modified in transit, or originates from a non-authentic source, e.g. a tampered SDR terminal, and the transmission from the SDR terminal is discarded or inactivated, e.g. by completely disabling the SDR terminal or by turning it off, or by reloading the SDR code.

Thus, the integrity checking node on the network side must have access to the integrity protecting key, Rk, derived by the SDR protecting module of the SDR terminal. According to an exemplary embodiment, this is accomplished by the integrity checking node receiving said integrity protecting key Rk during AAA signalling from a key generating server in the home network. Said key generating server has to know the cryptographic key K in the SDR protecting module in order to generate the integrity protecting key Rk. Since the cryptographic key K is stored in the above-mentioned terminal register unit, TR, the key generating server receives K via an interface to the terminal register unit, performs the calculation of Rk and forwards Rk to the integrity checking node, possibly via other network nodes, e.g. AAA proxies. The key generating server calculates Rk from K, and from other Rk generating input values, such as e.g a random nonce, i.e. a number or a bit string used only once in an authentication process, or hash values of authentic SDR software. The terminal register unit preferably stores copies of the SDR software, and is able to provide the key generating server with hash values of the SDR software.

According to an alternative exemplary embodiment, the integrity checking node in the access network derives the integrity protecting key Rk. This is enabled by a node in the home network transferring the Rk generating input values, comprising the cryptographic key K, tc said integrity checking node in the access network, Different allowed versions of the SDR software can be used by an SDR terminal, and the access network has to use the same version in the communication with the SDR terminal. If copies of the SDR software is stored in the terminal register unit for the calculation of the integrity protecting key Rk, a suitable node in the home network, e.g. the key generating server, can be arranged to transfer information to the access network regarding the used SDR software version, and thereby simplify the handling of the different SDR software versions.

If the Rk generating input values comprises keys associated with a SIM/USIM, the key generating server preferably receives the keys via interfaces to the HLR/AuC, or to the HSS, which maintains copies of the SIM and USIM keys, respectively. Therefore, in this embodiment it is advantageous if the key generating server is co-located with the HLR/AuC, or with the HSS, such that the key generating server interfaces both the terminal register unit and the HLR/AuC, or the HSS. The other Rk generating input values, e.g. nonces, is preferably generated by the key generating server and transmitted to the SDR terminal, since these values do not have to be protected.

Figure 3:
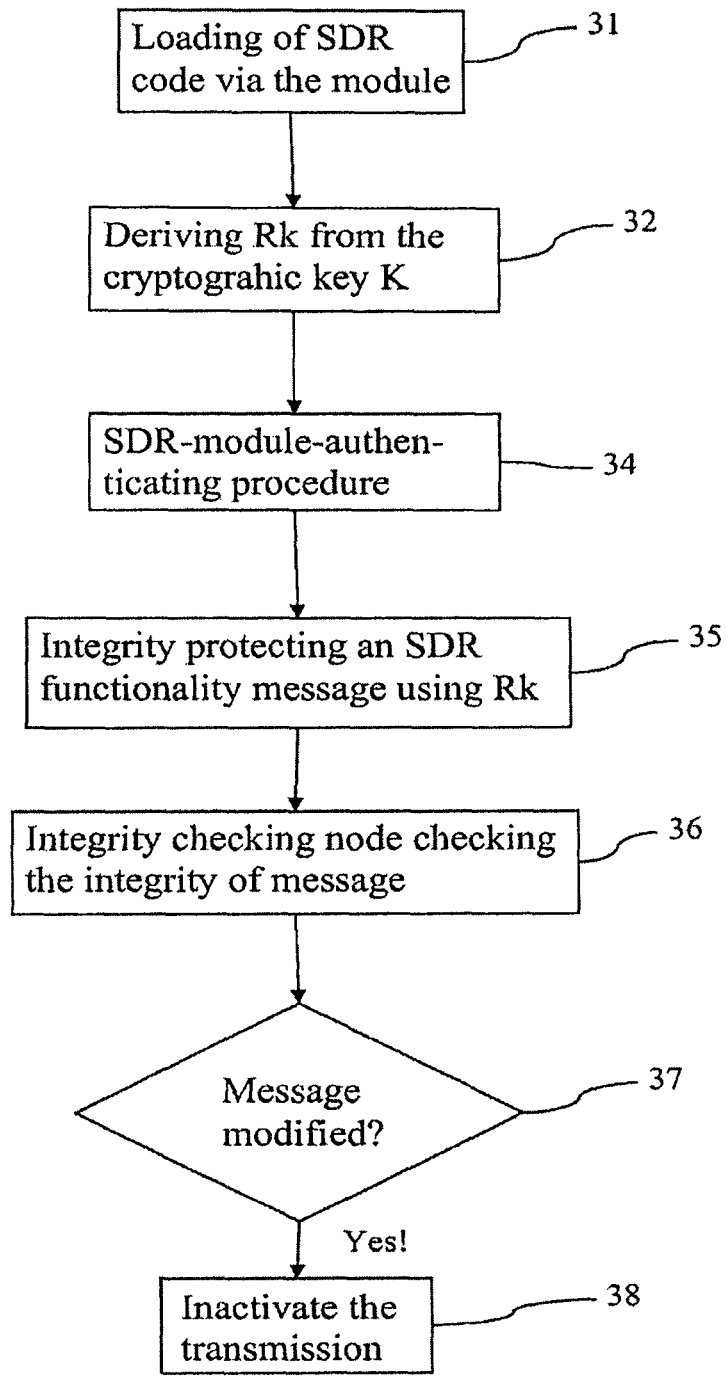
FIG. 3 is a flow diagram illustrating an exemplary method of integrity protection, according to a first embodiment of this invention.

FIG. 3 is a flow diagram illustrating a first embodiment of the method according tc the invention, comprising integrity protection of an SDR-functionality message from an SDR mobile terminal. In step 31, an SDR-protecting module receives SDR-code loaded from an SDR code storage, and in step 32, the module derives an integrity protecting key, Rk, from a secret confined cryptographic key, K, configured in the SDR-protecting module. In step 34, it is verified that the module is in place by the above-described SDR-module authenticating procedure, using the terminal register unit in the network storing a copy of the cryptographic key K. Since the generation of the integrity protecting key, in the above-described step 32, normally is a part of the authentication procedure, step 32 may be considered a sub-step of step 34. Further, in step 35, an SDR-functionality message is integrity protected using said integrity protecting key Rk derived by the module, by a computation of an message authenticating checksum, MAC, from the derived integrity protection key, Rk, and from the message, and appending the checksum to the message, in the corresponding data field, e.g. in the tail of the data packet.

In step 36, the message is received by the integrity checking node in the network, which checks the integrity of the message by computing a message authenticating checksum, MAC, from the received message and from the integrity checking key, Rk, received from a key generating server in the home network. The key generating server derives said integrity protecting key Rk from the cryptographic key K obtained from the terminal register unit. In step 37, the integrity checking node compares the computed message authenticating checksum with the received message authenticating checksum, and if the checksums do not correspond, the network inactivates the transmission from the SDR terminal, in step 38, e.g. by disconnecting the terminal.

According to second exemplary embodiment of this invention, the conventional SIM-authentication is combined, e.g. piggybacked, with the SDR-protecting module according to this invention, in order to provide a further improved security. This is accomplished by the SDR-protecting module deriving said integrity protecting key Rk by combining a cryptographic key K with the SIM security key Ki to form the key Rk=f(K, Ki, RAND), e.g. by hashing or XOR-ing K together with Ki. The Rk is authenticated by said integrity checking node in the RAN, thereby assuring that the correct SIM-card is in place, as well as the correctness of the message implementing the SDR-functionality. Alternatively, Rk is derived by combining the cryptographic key with the conventional RRC integrity protection key Ik derived from the SIM security key Ki, such that Rk=f(K, Ik).

Figure 4:
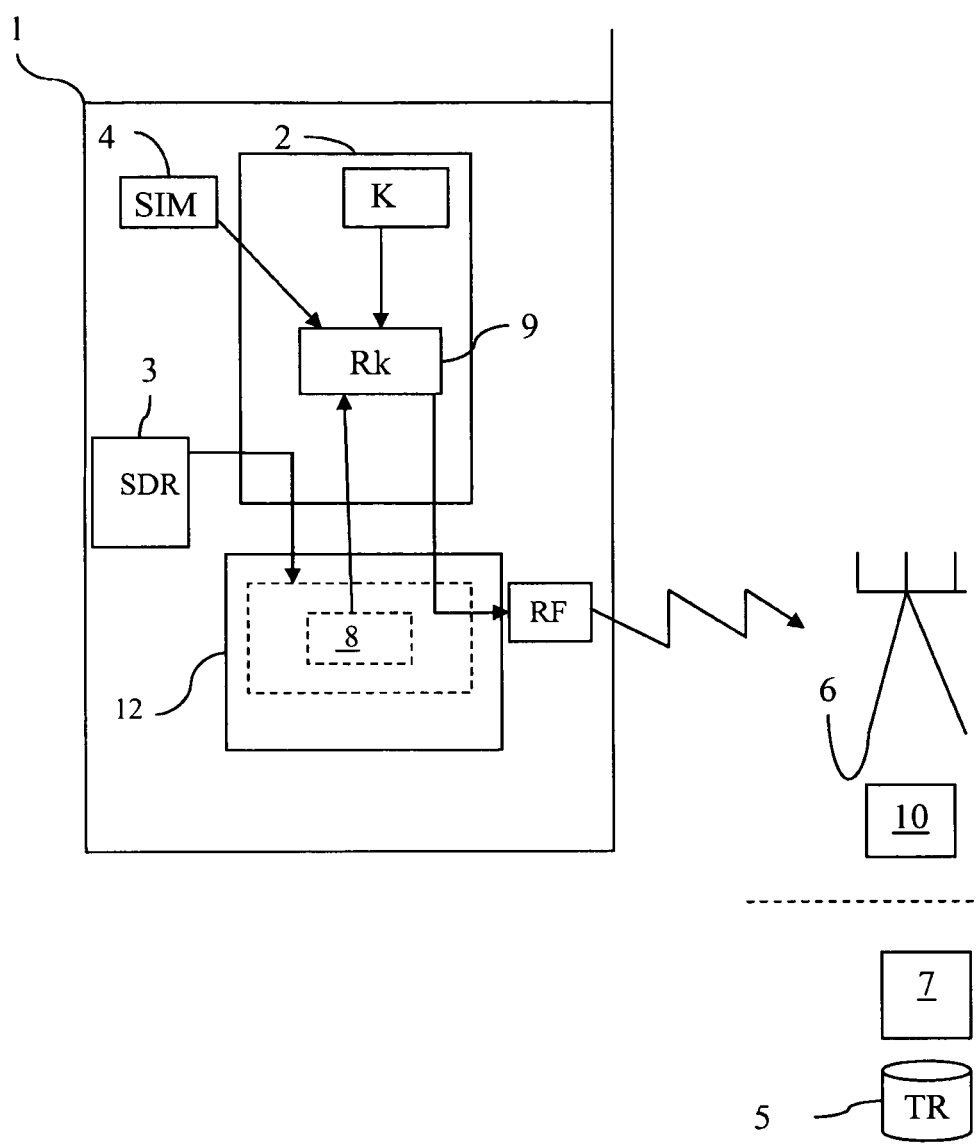
FIGS. 4 and 5 are block diagrams illustrating the architecture of a mobile SDR terminal provided with an SDR-protecting module, according to two exemplary embodiments of this invention.

FIG. 4 illustrates the architecture of an SDR-terminal 1 comprising an SDR-protecting module 2 for performing the above-described second embodiment of the method. The SDR-code is loaded from the SDR-code storage 3 into an SDR-execution environment 12 via the SDR-protecting module, which is assured by the terminal platform, for a conventional verification of the correctness of the loaded SDR-code. An integrity protecting key Rk is derived by the SDR-protecting module 2 from the cryptographic key, K and from information derived from the security key Ki of the SIM. The integrity protecting key Rk is, correspondingly, derived by the key generating server 7 at the network side and transmitted to the integrity checking node 10 located within the RAN (Radio Access Network) by AAA signalling, the integrity checking node being e.g. the RNC (Radio Network Controller) 6. The key generating server 7 derives said integrity protecting key Rk from the secret cryptographic key K obtained via the terminal register unit 5, and from the keys of the SIM, obtained via the HLR/AuC. Further, an SDR-module authenticating procedure verifies that the SDR-protecting module is in place, using said terminal register unit 5 of the home network. The loaded SDR-code comprises a control plane signalling generation unit 8, e.g. an RRC signalling generating unit, which integrity protects an SDR-functionality message using the integrity protecting key Rk, which is obtained from the integrity unit 9 of the SDR-protecting module. Thereafter, the correctness of the message is checked by said integrity checking node 10.

Figure 5:
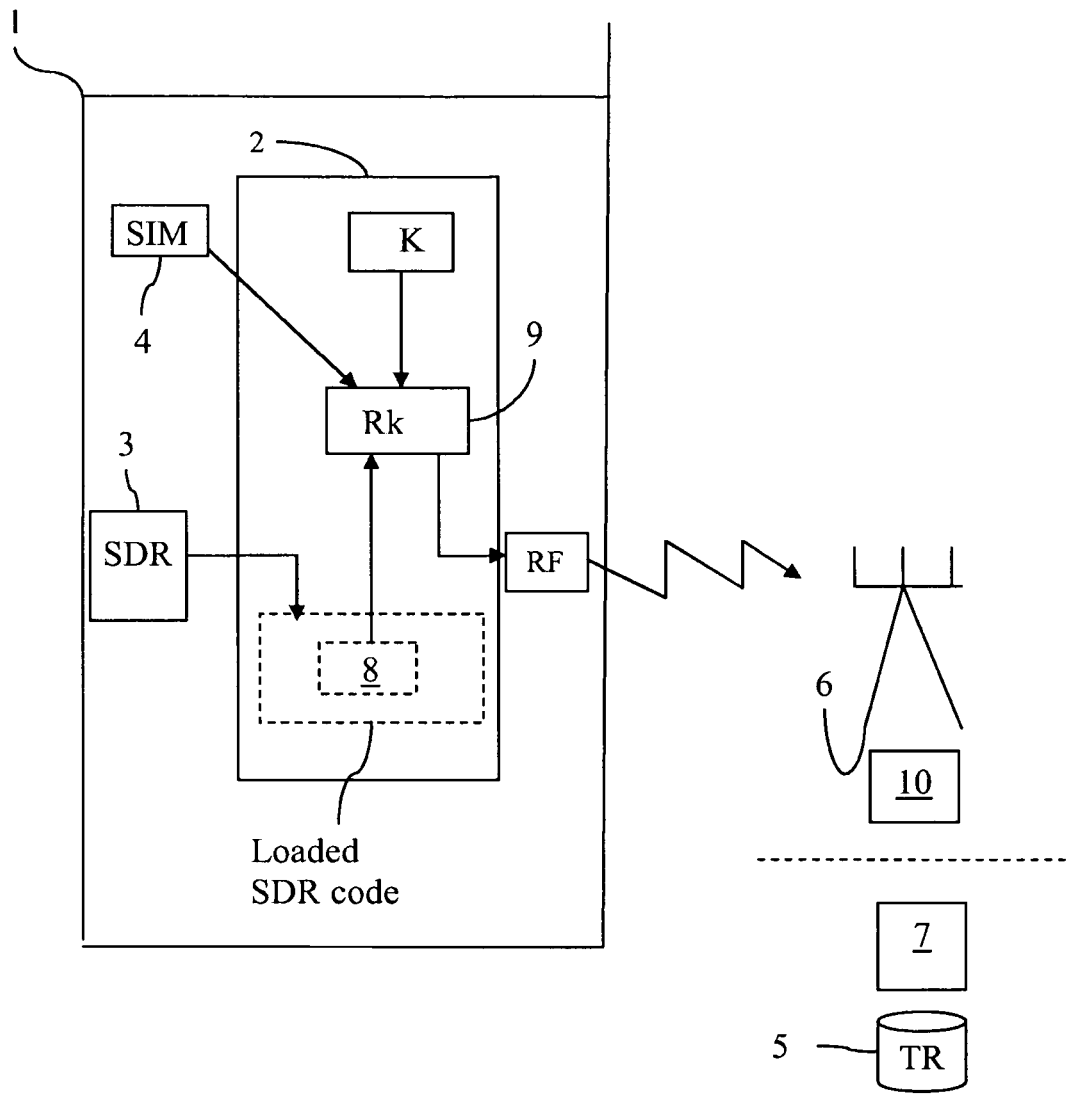

According to a third embodiment of this invention, a further increased security is obtained by performing a specific and critical part of the RRC signalling generation and processing inside the SDR-protecting module 2, as illustrated in FIG. 5, by providing an SDR-execution environment within the SDR-protecting module 2. The SDR-code is loaded from the SDR-code storage 3 into the SDR-protecting module 2, and the integrity of the loaded SDR code is verified before execution. The RRC signalling generation and processing is performed by the control plane signalling generation unit 8, which is loaded as a part of the SDR-code, and the RRC signalling is integrity protected inside the SDR protecting module, using the integrity protection key Rk derived by the SDR protecting module from the cryptographic key K and from information derived from the security key Ki of the SIM 4, the integrity protecting key Rk available via the integrity unit 9 of the module. Thereafter, the integrity of the integrity protected messages is checked by the integrity checking node 10, which receives the integrity protecting key Rk from the key generating server 7 of the home network.

Figure 6:
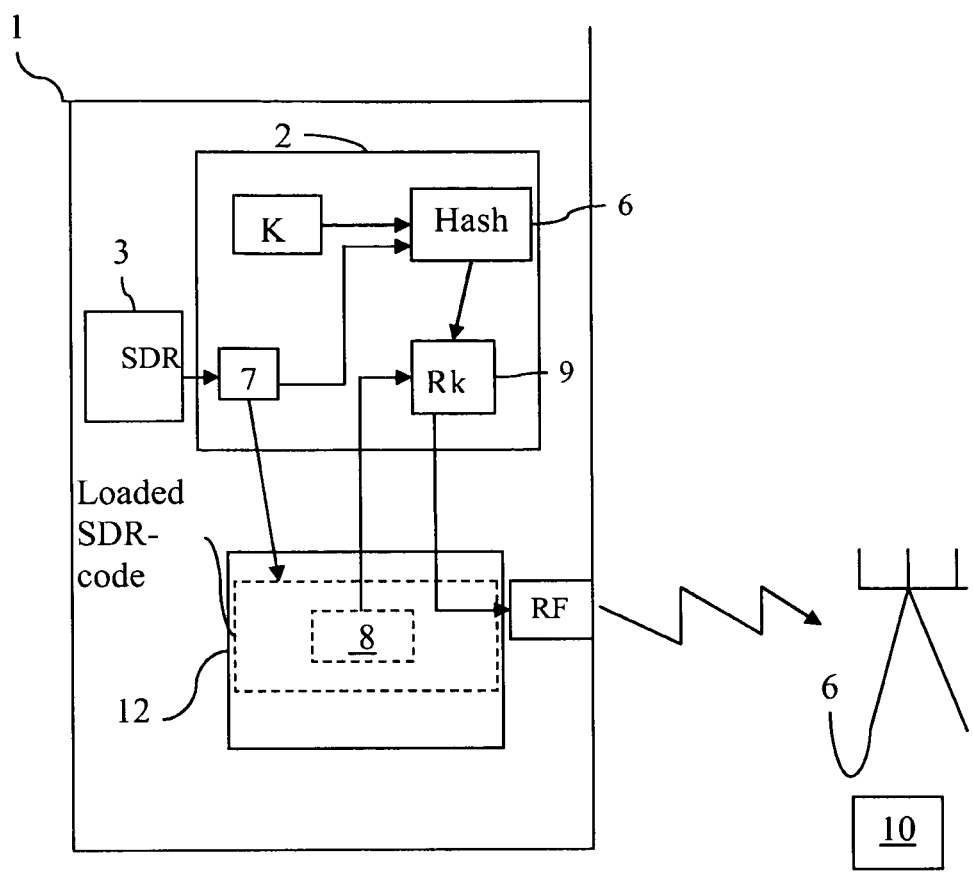
FIG. 6 is a block diagram schematically illustrating the architecture involved when the integrity protection key Rk depends on the loaded SDR-code, according to a further embodiment of this invention.
Figure 6:
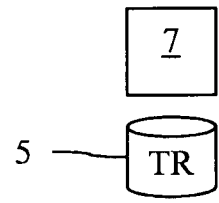

FIG. 6 illustrates an SDR-protecting module 2 capable of a so-called implicit verification of loaded SDR code, according to a fourth embodiment of this invention, thereby requiring no explicit verification in the SDR-protecting module 2 of the correctness of the loaded SDR-code. According to this exemplary embodiment, the terminal platform is configured to ascertain that the SDR-code is always loaded into the SDR protecting module 2 from the SDR-code storage 3 via the loader 7 of the module. The SDR code is further hashed in the hash unit 6, and included in the integrity protection key-calculation, i.e. a checksum of the loaded SDR code is computed in the hash unit 6 and the integrity protecting key Rk derived in the integrity unit 9 depends on both the cryptographic key, K, and on said checksum of the loaded SDR code. The control plane signalling generation unit 8, which is loaded into the SDR execution environment 12 as part of the SDR code, will use the key Rk obtained from the integrity unit 9 to integrity protect SDR functionality messages. Thereby, if the loaded SDR code is incorrect, e.g. because it is manipulated by a user prior to loading, the derived key Rk will also be incorrect, and hence a transmitted message will not be accepted by the integrity checking security node 10 in the home network, located e.g. in the RNC (Radio Network Controller) 6. Thus, according to this embodiment, the SDR-protecting module does not have to explicitly verify the correctness of a loaded SDR code. Instead, the verification is implicit via the derived Rk, such that an incorrect SDR code will result in an incorrect Rk. In particular, if the control plane signalling generation unit tries to by-pass the integrity unit 9 in the SDR protecting module, it will fail to produce a correct message authenticating- checksum to the integrity checking security node 10. The integrity checking node 10 receives correct integrity protecting key Rk from the key generating server 7, which derives Rk from the cryptographic key K stored in the terminal register unit 5 of the network, and from the copy of the loaded SDR code, which also may be stored in said terminal register unit 5. It should be noted that a skilled and malicious user may still be able to replace the code after it has been loaded. Therefore, the requirement that the terminal platform has to ascertain that the code is always loaded via the loader 7 is essential for achieving the desired high level of security.

Figure 7:
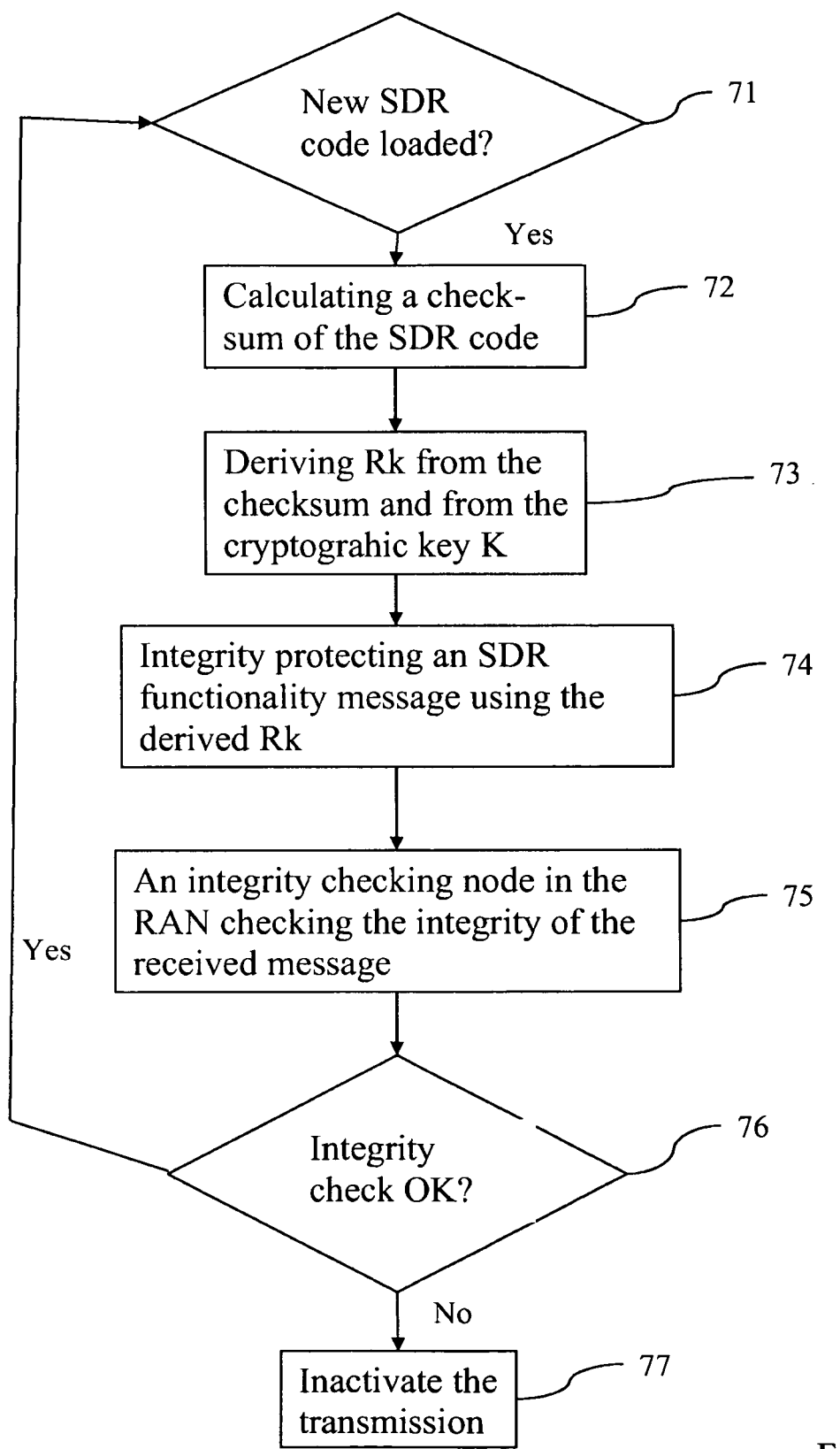
FIG. 7 is a flow diagram illustrating an exemplary method of integrity protection performed by an architecture according to the FIG. 6.

FIG. 7 is a flow diagram illustrating a method of implicit verification of the loaded SDR code, according to the above-described fourth embodiment of the invention. In step 71, it is checked if new SDR code, comprising the control plane signalling generation unit 8, has been loaded into the SDR environment 12 via the loader 7 in the SDR-protecting module 2. If yes, a checksum of the loaded SDR code is calculated, in step 72, and an integrity protection key Rk is derived from the secret cryptographic key K and from the checksum of the loaded SDR code, in step 73. In step 74, an SDR functionality message is integrity protected in the SDR protecting module before transmission, using the derived integrity protection key Rk, and the integrity of the message is checked, in step 75, in the integrity checking node in the RAN. If it is determined, in step 76, that integrity of the message can not be confirmed, since the message authenticating checksums, MACs, do not correspond, the transmission from the mobile terminal is inactivated, in step 77. Otherwise, if the integrity of the message is confirmed, the transmission continues. The procedure is repeated when it is determined, in step 71, that new SDR code is loaded.

Figure 8:
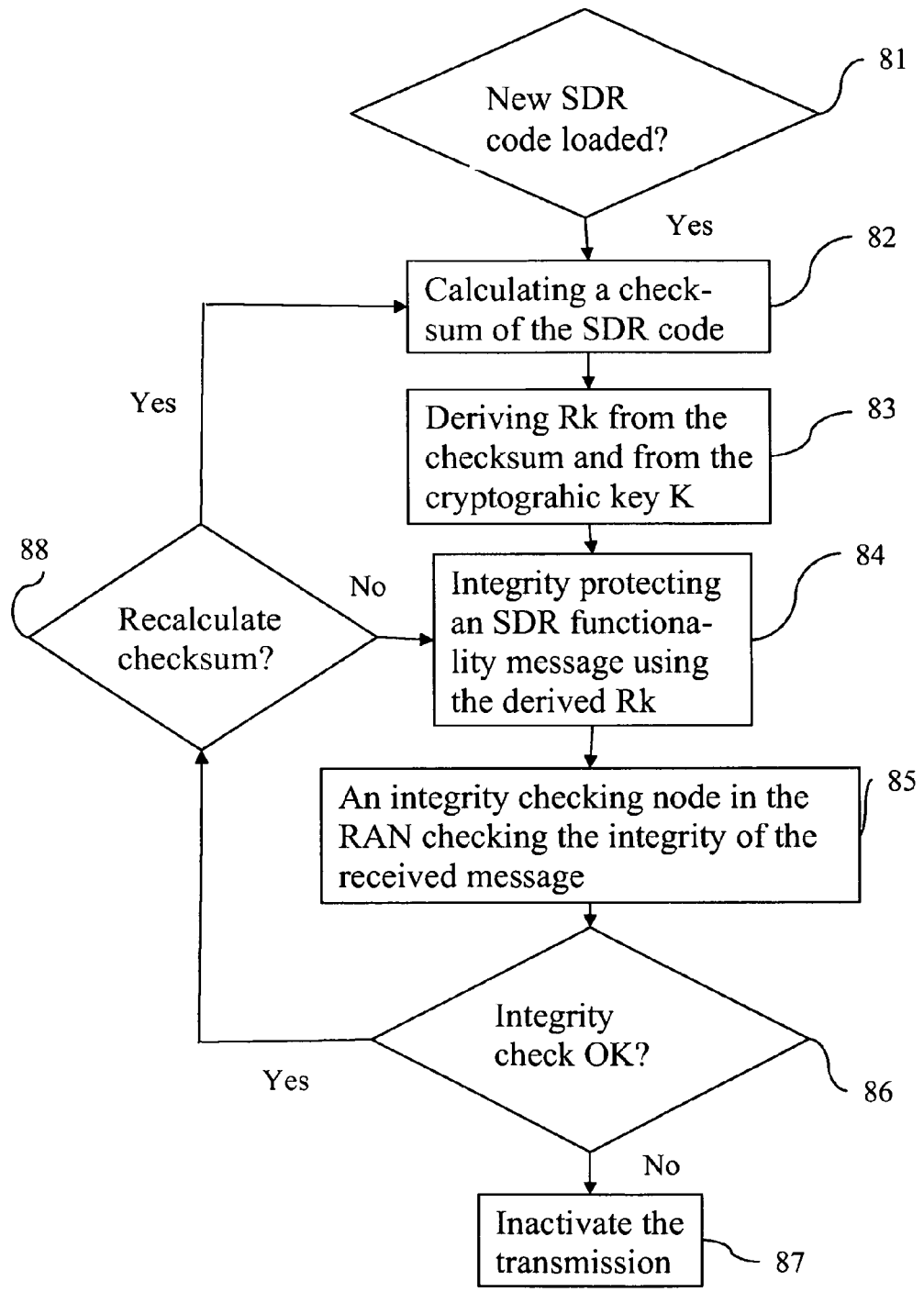
FIG. 8 is a flow diagram illustrating an alternative exemplary method of integrity protection performed by the architecture according to the FIG. 6.

According to a fifth exemplary embodiment of the invention, relating to the above-described implicit verification of the loaded SDR code, the checksum of the loaded SDR code, as well as the subsequently derived integrity protecting key Rk, is re-calculated periodically, in order to achieve a further increased security. This fifth exemplary embodiment is illustrated in FIG. 8, which basically corresponds to FIG. 7, but in which an additional step 88 is added, to be performed if the integrity of the message it confirmed, in step 86. In step 88, it is determined, preferably by a suitable period-calculating algorithm, whether the checksum should be re-calculated or not. If yes, the checksum is recalculated in step 82, and Rk is derived in step 83 from the recalculated checksum. If no, the previously derived integrity protection key Rk is used for the integrity protection, in step 84. When it is determined in step 81 that new SDR code is loaded, the procedure is repeated.

In an SDR-protecting module according to the above-described fourth and fifth embodiments, as illustrated in the FIG. 6, a derived integrity protecting key Rk may depend on different parameters. If a hash of the loaded SDR code is used to generate the integrity protection key Rk, it is possible to allow any SDR code to be loaded, since the loading of an incorrect SDR code results in an incorrect integrity protection key Rk. Thus, an SDR protecting module according to the fourth and fifth embodiments, checks that correct SDR code is loaded by asserting that a correct integrity protection key Rk is derived, and preferably re-generated at certain intervals.

According to a sixth embodiment of this invention, the integrity checking node in the access network performs the calculation of the integrity protecting key Rk. This is enabled by a suitable node in the home network, e.g. the key generating server, transferring the Rk generating input values to the access network, the input values comprising the cryptographic key K, or values derived therefrom, and possibly information regarding the used SDR software version. According to a seventh embodiment, the information indicating the SDR software version is forwarded to the RBS (Radio Base Station), and/or to other nodes in the access network, such as e.g. the RNC, thereby simplifying the selection of the correct SDR version.

According to an eighth embodiment of this invention, an SDR-protecting module 2 that is arranged to perform implicit verification of the loaded SDR code, according to the above-described fourth, fifth and sixths embodiments, is further arranged to include only a part of the loaded SDR code into the generation of the checksum to be included in the derivation of the integrity protection key, e.g. a part of a loaded SDR code associated with one or more of the non-physical control plane layers, such as with e.g. the RRC-, the MAC- or with the RLC-layer functionalities. Thereby, the SDR-protecting module is arranged to perform implicit verification of the loaded SDR code associated with only one or more of the control plane-layers, e.g. with the RRC-layer or with the MAC-layer, or with both.

If the integrity check reveals that incorrect SDR code is loaded, or that an incorrect SDR functionality message is transmitted from the SDR terminal, the transmission from the mobile terminal is inactivated, e.g. preferably followed by a reloading of SDR code and a restart of the SDR terminal. According to an exemplary embodiment, this is achieved by the SDR protecting module completely disabling the control plane signalling generation if the SDR protecting module detects that an incorrect SDR code is loaded into the SDR protecting module. If the integrity checking node 10 in the access network detects that a control plane signalling message is manipulated, the mobile terminal is preferably disabled by the access network disconnecting the mobile terminal from the network.

This invention may further involve information from higher protocol layers, e.g. from the TCP (transport layer) protocol that provides an ACK (ACKNOWLEDGEMENT) mechanism by which a mobile terminal acknowledges the receipt of data, and if the terminal does not provide an ACK within a certain time, a re-transmission occurs. Therefore, it is not in the interest of an SDR terminal to withhold the TCP ACKs, since this will only result in a retransmission of the data. The retransmission will occupy bandwidth, and the terminal will not receive an optimal bandwidth. A high correlation between RRC bad reception-signal reports and TCP ACKs from a terminal indicates that the messages from the terminal may be manipulated, e.g. in order to steal bandwidth. Therefore, an integrity checking node may perform a correlation integrity check by determining the correlation between received TCP ACKs and RRC bad reception signal reports regarding a terminal, and inactivate the transmission if the correlation is high.

In a ninth embodiment of this invention, the above-described correlation integrity check is combined with the use of the SDR-protecting module. The integrity checking node in the access network performs an additional correlation integrity check in order to correlate the RRC signal messages reporting bad reception with the presence of TCP ACKs from the same terminal, and a high correlation between bad reception messages and TCP ACKs from a terminal indicates that the messages from the terminal may be manipulated, e.g. in order to steal bandwidth. Thus, even if the RRC signal report messages are properly integrity verified by the integrity checking node, the additional correlation integrity check will provide an increased protection for malfunctioning of the SDR module. Other exemplary embodiments may use other protocols having similar mechanisms, such as e.g. the IETF Real-time Transport Protocol (RTP) which is used e.g. for VoIP or HD TV. This protocol contains a control part, RTCP, by which a receiving terminal sends application layer reception status reports, comprising the number of received data packets. If this status report indicates a good reception, while the lower RRC layer indicates bad reception, a message may have been manipulated by a skilled and malicious user.

While the invention has been described with reference to specific exemplary embodiments, the description is in general only intended to illustrate the inventive concept and should not be taken as limiting the scope of the invention.

The invention claimed is:

1. An SDR-protecting module for an SDR terminal, wherein the SDR-protecting module is provided with a confined cryptographic key K and configured to:
   receive loaded SDR-code,
   derive an integrity-protecting key Rk at least from:
      (1) the confined cryptographic key K, and
      (2) one or more of:
         (a) a value based on a security key of a subscriber identity module of the SDR terminal, and
         (b) a value based on at least part of the loaded SDR-code; and
   provide integrity protection of one or more SDR functionality messages using the integrity-protecting key Rk, wherein integrity of the SDR functionality messages is verified by an integrity-checking node in an access network using the integrity-protecting key Rk derived by the access network from K.

2. The SDR-protecting module of claim 1, wherein the integrity-checking node is configured to receive the integrity-protecting key Rk from a key generating server of a home network by AAA signaling, and the key generating server is arranged to derive the integrity-protecting key Rk from at least the cryptographic key K.

3. The SDR-protecting module of claim 1, wherein the integrity-checking node is configured to derive the integrity-protecting key Rk from input values received from a home network of the SDR terminal, wherein at least one of the input values is dependent on the cryptographic key K.

4. The SDR-protecting module of claim 1, wherein a copy of the cryptographic key K is stored in a terminal register unit in a home network of the SDR terminal.

5. The SDR-protecting module of claim 1, wherein the SDR functionality messages comprises radio signal measurement reports.

6. The SDR-protecting module of claim 1, wherein the integrity protection comprises:
   a control plane signal-generating unit calculating a message-authenticating checksum, for an SDR functionality message, using the integrity-protecting key Rk; and
   adding the message-authenticating checksum to the message before transmission.

7. The SDR-protecting module of claim 1, wherein the SDR functionality messages are associated with an RRC layer.

8. The SDR-protecting module of claim 1, wherein the SDR functionality messages are associated with a MAC layer.

9. The SDR-protecting module of claim 1, wherein the SDR-protecting module is configured to receive SDR-code loaded directly from an SDR code storage and to verify correctness of the loaded SDR-code.

10. The SDR-protecting module of claim 9, wherein the module is configured to inactivate a control plane signal-generating unit in response to determining that the loaded SDR-code is incorrect.

11. The SDR-protecting module of claim 9, wherein the value based on at least part of the loaded SDR-code corresponds to a checksum of the loaded SDR-code.

12. The SDR-protecting module of claim 11, wherein calculating the checksum and deriving the integrity-protecting key Rk, is repeated periodically.

13. The SDR-protecting module of claim 11, wherein the checksum is dependent on a portion of the loaded SDR-code associated with the RRC layer.

14. The SDR-protecting module of claim 11, wherein the checksum is dependent on a portion of the loaded SDR-code associated with the MAC layer.

15. The SDR-protecting module of claim 1, wherein the integrity-protecting key Rk is further derived from a random nonce.

16. The SDR-protecting module of claim 1, wherein the SDR-protecting module provides an execution environment for at least a part of RRC signaling and processing.

17. The SDR-protecting module of claim 1, wherein the module is implemented at least partly as a hardware module.

18. The SDR-protecting module according to claim 1, wherein the confined cryptographic key K is not available outside of the SDR-protecting module.

19. An SDR terminal comprising at least one SDR-protecting module wherein: the SDR-protecting module is provided with a confined cryptographic key K and configured to:
   receive loaded SDR-code;
   derive an integrity-protecting key Rk based on at least:
      (1) the confined cryptographic key K, and
      (2) one or more of:
         (a) a value based on a security key of a subscriber identity module of the SDR terminal, and
         (b) a value based on at least part of the loaded SDR-code; and
   provide integrity protection of one or more SDR functionality messages using the integrity-protecting key Rk, wherein integrity of the SDR functionality messages is verified by an integrity-checking node in an access network using the integrity-protecting key Rk derived by the access network from K.

20. The SDR terminal according to claim 19, wherein the confined cryptographic key K is not available outside of the SDR-protecting module.

21. A method of protecting integrity of SDR-functionality software by using an SDR-protecting module provided with a confined cryptographic key K, the method comprising:
   the SDR-protecting module receiving loaded SDR-code;
   the SDR-protecting module deriving an integrity-protecting key Rk based on at least:
      (1) the cryptographic key K, and
      (2) one or more of:
         (a) a value based on a security key of a subscriber identity module of the SDR terminal, and
         (b) a value based on at least part of the loaded SDR-code; and
   the SDR-protecting module providing integrity protection of one or more SDR functionality messages using the derived integrity-protecting key Rk, wherein integrity of the SDR functionality messages is verified by an integrity-checking node in an access network using the integrity-protecting key Rk derived by the access network from K.

22. The method of claim 21, wherein the integrity protecting key Rk is further derived from at least a random nonce.

23. The method of claim 21, wherein the SDR-protecting module receives SDR-code loaded directly from an SDR code storage and verifies correctness of the loaded SDR-code.

24. The method of claim 21, wherein the value based on at least part of the loaded SDR-code corresponds to a checksum of the loaded SDR-code.

25. The method of claim 24, wherein the checksum of the loaded SDR-code is periodically recalculated and the integrity-protecting key Rk is recalculated using the recalculated checksum.

26. The method of claim 24, wherein the checksum is based on a portion of the loaded SDR-code associated with an RRC layer.

27. The method of claim 24, wherein the checksum is based on a portion of the loaded SDR-code associated with a MAC layer.

28. The method of claim 21, wherein the integrity-checking node further determines a correlation between RRC signal reports of bad reception and TCP ACKNOWLEDGEMENTS relating to an SDR terminal.

29. The method of claim 21, wherein the integrity-checking node receives the integrity-protecting key Rk from a key-generating server in a home network by AAA signaling.

30. The method of claim 29, wherein the key-generating server derives the integrity-protecting key Rk from a copy of the cryptographic key K stored in a terminal register unit in the home network.

31. The method of claim 30, wherein the key-generating server further derives the integrity-protecting key Rk from a copy of the loaded SDR-code stored in the terminal register unit.

32. The method of claim 30, wherein the key-generating server further derives the integrity-protecting key Rk from a copy of a key from a SIM or USIM stored in an HLR/AuC or a HSS of the home network.

33. The method of claim 21, wherein the integrity-checking node derives the integrity-protecting key Rk from input values received from a home network, wherein at least one of the input values is dependent on the cryptographic key K.

34. The method of claim 21, wherein a home network transfers, to an access network, information indicating an SDR-code version.

35. The method of claim 21, the method further comprising:
   the SDR-protecting module performing an SDR-module authenticating procedure to verify the presence of the SDR-protecting module, wherein the authenticating procedure comprises using information dependent on a copy of the confined cryptographic key K obtained from a terminal register unit of a home network.

36. The method of claim 21, wherein the SDR functionality messages comprise a radio signal measurement reports.

37. The method of claim 21, wherein the integrity protection comprises:
   a control plane signal-generating unit computing a message-authenticating checksum, for an SDR functionality message, using the integrity-protecting key Rk, and
   adding the authenticating checksum to the SDR functionality message before transmission.

38. The method of claim 37, wherein the integrity-checking node verifies a received SDR functionality message by: calculating a checksum of the message using the integrity-protecting key Rk and comparing the calculated checksum to the message authenticating checksum added to the message.

39. The method of claim 38, wherein the access network disconnects the mobile terminal in response to determining that the compared checksums do not correspond.

40. The method of claim 21, wherein the SDR functionality messages are associated with an RRC layer.

41. The method of claim 21, wherein the SDR functionality messages are associated with a MAC layer.

42. The method of claim 37, further comprising: the SDR-protecting module deactivating the control plane signal-generating unit in response to determining that the loaded SDR-code is incorrect.

43. The method according to claim 21, wherein the confined cryptographic key K is not available outside of the SDR-protecting module.

* * * * *

UNITED STATES PATENT AND TRADEMARK OFFICE
CERTIFICATE OF CORRECTION

PATENT NO. : 8,977,852 B2  
APPLICATION NO. : 12/601569  
DATED : March 10, 2015  
INVENTOR(S) : Näslund et al.

Page 1 of 1

It is certified that error appears in the above-identified patent and that said Letters Patent is hereby corrected as shown below:

In the specification

In Column 5, Line 20, delete "invention, and" and insert -- invention; --, therefor.

In Column 5, Line 23, delete "FIG. 6;" and insert -- FIG. 6; and --, therefor.

In Column 9, Line 38, delete "tc" and insert -- to --, therefor.

In Column 9, Line 63, delete "tc" and insert -- to --, therefor.

In Column 11, Line 55, delete "tc" and insert -- to --, therefor.

Signed and Sealed this
Twenty-third Day of February, 2016

Michelle K. Lee
*Director of the United States Patent and Trademark Office*